Jan. 21, 1958 C. E. SMITH 2,820,382
TENSION-APPLYING NUT AND BOLT, AND METHOD
AND MEANS OF APPLYING SAME
Filed July 12, 1956
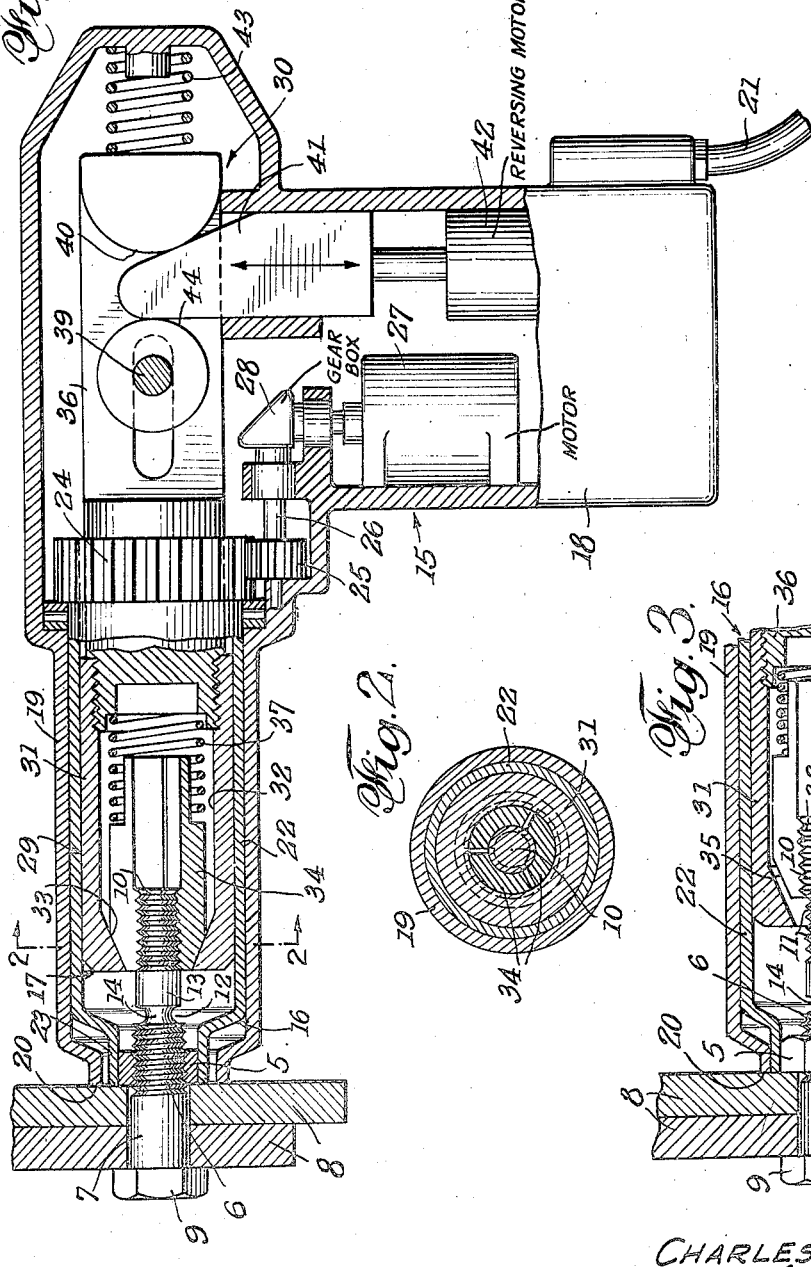
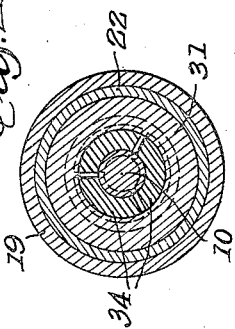
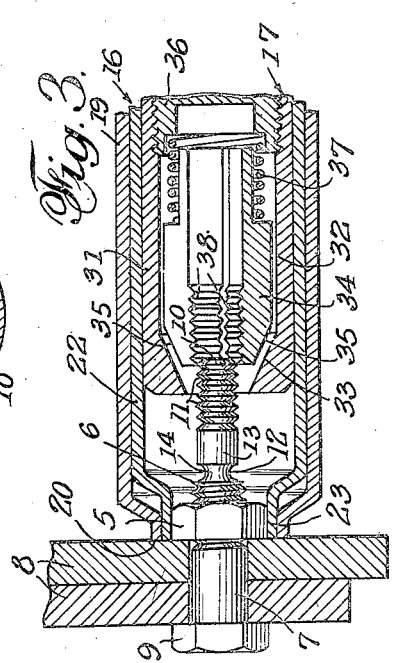
INVENTOR.
CHARLES E. SMITH
BY C. F. Stratton
ATTORNEY

United States Patent Office 2,820,382
Patented Jan. 21, 1958

2,820,382

TENSION-APPLYING NUT AND BOLT, AND METHOD AND MEANS OF APPLYING SAME

Charles E. Smith, Los Angeles, Calif.

Application July 12, 1956, Serial No. 597,417

6 Claims. (Cl. 81—54)

This invention relates to means for applying a nut onto a stud or bolt and deals generally with a mechanism for applying an internally threaded member on an externally threaded member while the latter is maintained in tension to, thereby, insure a predictable tensile preload, and guard against accidental loosening of the member under vibration and other loosening forces.

An object of the present invention is to provide mechanism that tightly applies a nut on a stud or bolt and, by placing the latter under a tension force that produces elongation thereof, utilizes spring-back to maintain the nut in tight and non-loosening engagement with whatever work the stud or bolt is fastening.

Another object of the invention is to provide a novel, simple and improved method for tightly applying nuts or the like on bolts or the like without using torque wrenches or other means commonly used for this purpose.

A further object of the invention is to provide mechanism for placing a stud or bolt under elongating tension while simultaneously applying a nut to such stud or bolt, the tension being sufficient to disrupt a weakened or thinned-out portion of the latter without, however, disrupting the nut-engaging portion of the same.

A still further object of the invention is to provide a power tool for the purpose of applying a nut while simultaneously applying tension to the threaded shank on which the nut is being applied, thereby making the operation independent of the strength of the operator.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a longitudinal sectional view of a tool embodying mechanism according to the present invention.

Fig. 2 is a cross-sectional view as taken on line 2—2 of Fig. 1.

Fig. 3 is a fragmentary longitudinal sectional view showing one manner of applying the present tool to spin a nut on a threaded shank.

According to the present invention, a nut 5 is applied to the threaded shank 6 of a bolt 7 for the purpose of fastening a pair of plates or other members 8 between said nut 5 and the head 9 of the bolt. The foregoing is intended as typical since the bolt 7 may comprise a stud or other externally threaded male member and the nut 5 any suitable type of female member.

The present threaded shank 6 is provided with a break-off extension 10 that is formed with annular (or otherwise directed) pull grooves 11 and is connected to the end of the shank by a break-off groove 12. The extension 10 is small enough diametrally to allow nut 5 to be installed thereover. It is believed clear without further illustration that the extension 10 may be threaded, if desired. Adjacent the groove 12, a cylindrical nut-piloting portion 13 is provided to facilitate starting the nut on the threads of shank 6. The break-off groove 12 defines a neck 14 that is smaller in cross-sectional size than either the root diameter of the shank 6 or the base diameter of pull groove 11, the cross-sectional area of which is determined by the desired disruption load.

It will be clear from the foregoing that by placing shank 6 in tension by pulling on the extension 10, said shank will tend to elongate. If the neck 14 is made of a size to eventually yield to such tension force, a nut being snugly applied to the shank will achieve tight opposition to the head 9 as the shank attempts to contract from whatever elongation the applied force has produced therein. The only care that need be taken is to insure that the nut is kept snugly against the plates 8 so that the spring-back of the shank 6 will maintain the mentioned nut and head in tight gripping contact with the plates.

The present tool or mechanism for performing the above-described operation comprises, generally, a body 15 for housing the hereinafter-described mechanism and constituting a means for producing a reaction force while the tool is being applied, nut-driving means 16 within the body 15, and means 17 for pre-loading the shank to place the same in tension during operation of the nut-driving means.

While the present tool may vary in size and shape and may be provided as a tool element of a stationary machine, the same is here shown as a hand-applied tool. Accordingly, the body 15 is formed to have a hand-grasping portion 18 and a preferably cylindrical housing 19 extending therefrom and having a bucking end 20, the same being adapted to be applied, as to members 8, to enable a reaction force to be applied during tool operation. It will be realized that grip 18 may be formed as a machine component and moved toward and from members 8 under mechaninical rather than manual control. Suitable power, either electrical, hydraulic or pneumatic, may be conducted to the interior of body 15 as by way of a conduit 21 to serve the means 16 and 17.

The nut-driving means 16 is shown as comprising a sleeve 22 inward of housing 19 and mounted to be rotational in said housing. The end 23 of sleeve 22 is provided with a nut-engaging form and is adapted to slip over nut 5 in the manner of a wrench. At the end opposite the wrench end 23, said sleeve 22 may be provided with a gear 24 as a means by which said sleeve may be rotated.

As shown in Fig. 1, one way of rotating sleeve 22 may comprise a pinion 25 in driving engagement with gear 24 and mounted on a jack shaft 26, and a motor or other prime mover 27 connected to rotate said shaft 26 as through the medium of a gear box 28. While the drive means may vary, it is essential that the direction of rotation of sleeve 22 be in the direction desired—right hand for right hand threads on shank 6, and left hand for left hand threads. If desired, the motor 27 may be reversible so that the desired direction of rotation of sleeve 22 may be had.

The means 17 for applying tension to the shank 6 is shown as a chuck 29 disposed inside sleeve 22 and adapted to achieve connection with break-off extension 10, and means 30 to exert a retractive straight-line force on said chuck.

The chuck 29 comprises a housing 31 having a longitudinal bore 32 that, at its end directed toward the wrench portion of the tool, is provided with a conical wall 33, a set of gripping collets 34 disposed within said housing 31 and having conical end faces 35 conforming to the form of wall 33, an extension 36 connected to housing 31 and defining an end abutment for the bore 32, and a spring or the like 37 engaged with said abutment and the set of collets to bias the latter in a direction to engage wall 33 and collet faces 35.

It will be clear that said collets 34 may have retractive movement against the bias of spring 37 and this may occur when engaging said collets with the break-off extension 10. Engagement is achieved by the provision of grooves 38 that are the complements of the grooves 11 and, when interfitted with the latter, pull on housing extension 36 is transmitted to extension 10 and thus to shank 6.

While the entire chuck 29 is shown as retractive, as in Fig. 3, to allow the collets 34 to spread and thus achieve encompassing engagement of the break-off extension 10 by the grooved portions of said collets, the mechanism may contemplate only necessary retractive movement of only the collets to enable them to spread and achieve connection with extension 10. In any case, when the collets 34 are engaged with extension 10 and a rearward pull is applied to extension 36, the wall 33 and collet faces 35 coact to insure non-slipping interfit between grooves 11 and 38.

The means 30 represents one way of producing the mentioned rearward pull on extension 36. The same comprises a guide pin 39 carried by the body 15 and extending through a slot in extension 36, thereby guiding and acting as a stop for extension 36, a cam face 40 on extension 36, a cam reaction face 44 on pin 39, a wedge cam 41 engaged with faces 40 and 44, and a motor 42 to project the wedge cam in a direction to engage face 40 and exert the mentioned pull on extension 36 and to retract said wedge cam to allow a spring 43 to move the means forwardly. Thus, motor 42 is reversible and may be designed on the solenoid principle, if electric, or may be fluid-operated, as desired.

The operation of the tool is believed to be clear from the foregoing. After the nut has been applied and the extension 10 broken away, the tool is removed.

From the foregoing, it will be seen that when the tensile force being applied reaches a predetermined degree, sufficient to break the extension 10 away at neck 14, the nut 5 will be in snug position against plates 8 and will retain the tensile force that is present in the shank 6 at the time of severance at said neck.

While the foregoing has illustrated and described what is now contemplated to be the best mode of carrying out the invention, the construction is, of course, subject to modification without departing from the spirit and scope of the invention. It is, therefore, not desired to restrict the invention to the paricular form of construction illustrated and described, but to cover all modifications that may fall within the scope of the appended claims.

Having thus described my invention, what I claim and desire to secure by Letters Patent is:

1. Mechanism for applying a nut onto a threaded shank that is provided with a longitudinal rupturable extension, said mechanism comprising a set of laterally movable collet jaws to grip said extension, a sliding housing in which said jaws are disposed, means to exert a tension force on the housing and, thereby, through the collet jaws, on the extension, means around the housing to thread the nut onto the shank while said tension force is being applied, and a reaction force-applying end on said body and including a wedge cam and means to move the cam between housing-pulling and housing-pushing positions.

2. Mechanism for applying a nut onto a threaded shank that is provided with a longitudinal rupturable extension, said mechanism comprising laterally separable and contractable collet jaws, each formed with an inner face, a housing around said collet jaws and provided with a conical wall, means to exert a longitudinal pull on said housing in a direction to engage the conical wall thereof with the collets to draw the latter together with the inner faces thereof in gripping engagement with the rupturable extension, and a spring between the housing and the ends of the collets opposite to the face-provided ends and compressible during retractive movement of the jaws away from the conical housing wall during application of the mechanism to the rupturable extension.

3. Mechanism according to claim 1 in which the extension is provided with annular grooves that define annular ribs and the collet jaw inner faces are provided with complementary grooves and ribs to engage with the grooves and ribs of the extension when the jaws are in contact with the conical wall of the housing.

4. Mechanism according to claim 2 in which the extension is provided with annular grooves that define annular ribs and the collet jaw inner faces are provided with complementary grooves and ribs to engage with the grooves and ribs of the extension when the jaws are in contact with the conical wall of hte housing, the housing having an interior space in which the collet jaws are disposed and said shank being substantially larger diametrally than the collets when in gripping position whereby the jaws are adapted to spread laterally during application of the mechanism to the extension.

5. In a mechanism of the character described, a housing for a set of collet jaws which are adapted to engage with a rupturable bolt extension, means mounting the housing for longitudinal movement between jaw-contracting and jaw-releasing positions, and wedge cam means to slide said housing between the mentioned positions.

6. In mechanism according to claim 5, an extension on the housing and provided with a cam face, a reaction member fixedly carried relative to the housing, and the mentioned wedge cam means including a reciprocative cam wedge engaged between the cam face and the reaction member to move the housing between the mentioned positions thereof upon reciprocative movement of the cam wedge.

References Cited in the file of this patent

UNITED STATES PATENTS

| | | |
|---|---|---|
| 2,506,835 | Johnson | May 9, 1950 |
| 2,544,522 | Bertelsen | Mar. 6, 1951 |
| 2,562,419 | Ferris | July 31, 1951 |
| 2,575,525 | Mitchell | Nov. 20, 1951 |
| 2,631,485 | Stuart et al. | Mar. 17, 1953 |
| 2,736,219 | May | Feb. 28, 1956 |
| 2,756,622 | La Belle | July 31, 1956 |
| 2,760,393 | Stough | Aug. 28, 1956 |